US012771808B2

(12) United States Patent
Rocha, III et al.

(10) Patent No.: US 12,771,808 B2
(45) Date of Patent: Oct. 20, 2026

(54) PRE-RECORDED VIDEO ADS PLAY IN VIDEO CALL WAIT ROOM

(71) Applicant: Let's Roll Marketing LLC., Cockeysville, MD (US)

(72) Inventors: Thomas Rocha, III, San Antonio, TX (US); Darren C. Fransella, San Antonio, TX (US); Mark Dent, Cockeysville, MD (US)

(73) Assignee: Let's Roll Marketing LLC., Cockeysville, MD (US)

( * ) Notice: Subject to any disclaimer, the term of this patent is extended or adjusted under 35 U.S.C. 154(b) by 0 days.

(21) Appl. No.: 19/395,642

(22) Filed: Nov. 20, 2025

(65) Prior Publication Data

US 2026/0075164 A1 Mar. 12, 2026

Related U.S. Application Data

(63) Continuation-in-part of application No. 19/318,971, filed on Sep. 4, 2025.

(Continued)

(51) Int. Cl.
*H04N 7/15* (2006.01)
*G06V 10/764* (2022.01)

(Continued)

(52) U.S. Cl.
CPC ........... *H04N 7/155* (2013.01); *G06V 10/764* (2022.01); *G06V 20/44* (2022.01); *H04L 9/3213* (2013.01)

(58) Field of Classification Search
CPC ...... H04N 7/155; G06V 10/764; G06V 20/44; H04L 9/3213
See application file for complete search history.

(56) References Cited

U.S. PATENT DOCUMENTS 6,226,362 B1 5/2001 Gerszberg et al.
7,983,401 B1 7/2011 Krinsky (Continued)

FOREIGN PATENT DOCUMENTS

EP 4280596 A1 11/2023

OTHER PUBLICATIONS

International Search Report and Written Opinion by ISA/US of PCT/US25/56365, dated Jan. 28, 2026.

(Continued)

*Primary Examiner* — Olisa Anwah

(74) *Attorney, Agent, or Firm* — Outlier Patent Attorneys, PLLC

(57) ABSTRACT

A system and method for displaying pre-recorded video content in the waiting room of a video call. The invention replaces the blank screen or static image typically shown to users while waiting for the call to be answered with pre-recorded video messages or advertisements chosen by the video call provider. The system comprises a video calling platform, a database for storing pre-recorded content, and a content management system for selecting and displaying the appropriate video based on predefined criteria. When a user enters the waiting room, the selected video content is seamlessly displayed until the call is answered, providing an engaging and informative waiting experience while offering providers an opportunity to communicate with or promote to their audience.

19 Claims, 7 Drawing Sheets

Related U.S. Application Data

(60) Provisional application No. 63/903,793, filed on Oct. 22, 2025, provisional application No. 63/723,852, filed on Nov. 22, 2024, provisional application No. 63/690,709, filed on Sep. 4, 2024.

(51) Int. Cl.

*G06V 20/40* (2022.01)
*H04L 9/32* (2006.01)

(56) References Cited

U.S. PATENT DOCUMENTS

| | | | | |
|---|---|---|---|---|
| 8,831,573 | B2 | 9/2014 | Sigmund et al. | |
| 8,917,824 | B2 | 12/2014 | Zubas et al. | |
| 9,276,971 | B1 | 3/2016 | Walker et al. | |
| 10,862,863 | B2 | 12/2020 | Moore et al. | |
| 10,958,790 | B2 | 3/2021 | Norman et al. | |
| 11,562,657 | B1 * | 1/2023 | Fieldman | G09B 5/14 |
| 12,301,638 | B1 * | 5/2025 | Hutto | H04L 65/1093 |
| 2003/0043260 | A1 | 3/2003 | Yap et al. | |
| 2004/0203608 | A1 | 10/2004 | Osann, Jr. | |
| 2005/0283813 | A1 | 12/2005 | Jamail et al. | |
| 2005/0286519 | A1 | 12/2005 | Ravikumar et al. | |
| 2006/0133590 | A1 | 6/2006 | Jiang | |
| 2008/0273077 | A1 | 11/2008 | Cowherd | |
| 2009/0092234 | A1 | 4/2009 | St. Onge et al. | |
| 2011/0112901 | A1 | 5/2011 | Fried et al. | |
| 2012/0281819 | A1 | 11/2012 | Madhavapeddi et al. | |
| 2012/0320145 | A1 * | 12/2012 | Kahn | H04L 65/4025 348/E7.083 |
| 2014/0168344 | A1 | 6/2014 | Shoemake et al. | |
| 2016/0234264 | A1 * | 8/2016 | Coffman | H04L 65/4015 |
| 2016/0330599 | A9 | 11/2016 | Sigmund et al. | |
| 2017/0019247 | A1 | 1/2017 | Iyer et al. | |
| 2018/0098030 | A1 * | 4/2018 | Morabia | H04L 65/403 |
| 2020/0066414 | A1 * | 2/2020 | Neff | H04L 12/1818 |
| 2020/0186576 | A1 * | 6/2020 | Gopal | H04L 65/1083 |
| 2021/0264195 | A1 | 8/2021 | Ingram et al. | |
| 2021/0321002 | A1 | 10/2021 | DiMaria et al. | |
| 2022/0021680 | A1 * | 1/2022 | Roedel | H04N 7/155 |
| 2022/0076851 | A1 | 3/2022 | Kamangar | |
| 2022/0276879 | A1 * | 9/2022 | Rajagopal | G06F 16/9537 |
| 2022/0353367 | A1 | 11/2022 | Chau | |
| 2022/0353468 | A1 * | 11/2022 | Walia | H04N 7/147 |
| 2022/0368855 | A1 * | 11/2022 | Mcbride | G16H 80/00 |
| 2023/0156111 | A1 | 5/2023 | Pham | |
| 2023/0230683 | A1 | 7/2023 | Boyko et al. | |
| 2024/0187526 | A1 | 6/2024 | Scopes | |
| 2024/0244162 | A1 * | 7/2024 | Farmer | H04L 51/046 |

OTHER PUBLICATIONS

"Receive FaceTime calls on iPhone", Apple Support (FaceTime feature), 2023.
"Set up voicemail on your mobile phone", AT&T Wireless Customer Support / iPhone, 2007.
International Search Report and Written Opinion by ISA/US of PCT application No. PCT/US25/44821 dated Nov. 19, 2025.

* cited by examiner

PRE-RECORDED VIDEO ADS PLAY IN VIDEO CALL WAIT ROOM

CROSS-REFERENCE TO RELATED APPLICATIONS

This application claims the benefit of U.S. Provisional Application 63/723,852 filed Nov. 22, 2024, titled "PRE-RECORDED VIDEO ADS PLAY IN VIDEO CALL WAIT ROOM," which is herein incorporated by reference in its entirety.

This application claims the benefit of U.S. Provisional Application 63/903,793 filed Oct. 22, 2025, titled "Dynamic Accessibility Negotiation in Selective Multimedia Distribution," which is herein incorporated by reference in its entirety.

This application is a continuation-in-part of, and claims the benefit of U.S. Non-Provisional application Ser. No. 19/318,971 filed Sep. 4, 2025, titled "COMPUTE SYSTEMS AND PROCESSES FOR VIDEO MESSAGES," which claims the benefit of U.S. Provisional Application 63/690,709 filed Sep. 4, 2024, titled "COMPUTE SYSTEMS AND PROCESSES FOR VIDEO MESSAGES," which is herein incorporated by reference in its entirety.

BACKGROUND

Field of the Art

Video communications, marketing, software

Discussion of the State of the Art

In the current landscape of digital communication, a common issue arises when individuals are placed in a waiting room for a video meeting or put on hold. The standard practice is to present these individuals with a blank screen. This practice is not only unengaging, but it also fails to provide any useful information to the individual, such as an estimated wait time.

Conventional video conferencing systems typically present a blank or static screen while participants wait for a host to join. This results in an unproductive and disengaging experience, offering no feedback or context about connection status, expected wait time, or meeting purpose. Some systems have attempted to replace blank screens with generic animations or background music, but such implementations do not convey useful information or adapt dynamically to the meeting context.

Existing video platforms that attempt to display messages or media during pre-call stages often rely on manual uploads or pre-configured static content. These approaches require user intervention before each meeting and lack real-time decision-making to select content based on event type, audience, or time constraints. This manual configuration process introduces inefficiencies for system administrators and is not scalable across large meeting volumes.

Where solutions exist, they are frequently embedded within proprietary systems and are not compatible with third-party conferencing platforms. Integration often requires direct modification of platform software or plug-in installation, which restricts deployment and creates security and maintenance challenges. Moreover, these solutions often fail to adapt media delivery to varying device capabilities, bandwidth conditions, or encryption requirements.

Current solutions generally lack mechanisms for collecting analytics or engagement data related to the displayed media. Without structured logging of viewing durations, interaction rates, or playback errors, service providers cannot evaluate or optimize the effectiveness of displayed content. The absence of such data introduces inefficiency in content planning and prevents iterative improvements based on actual usage behavior.

Existing approaches do not leverage modern classification or machine learning techniques to dynamically determine which media asset should be displayed in a given session. Most rely on static scheduling or predefined playlists that fail to account for contextual parameters such as meeting purpose, participant profile, or engagement history. As a result, the content shown to users is often irrelevant, repetitive, or poorly timed, reducing potential engagement and system efficiency.

In many existing video communication systems, the delivery of auxiliary media such as pre-recorded announcements, accessibility streams, or interactive content requires the establishment of one or more additional media sessions that operate in parallel with the primary conferencing connection. Each additional session must independently negotiate encryption parameters, transport channels, and signaling procedures, leading to increased latency and resource overhead. These multi-session approaches also require the conferencing platform to maintain separate identifiers, such as unique SIP Call-IDs or WebRTC PeerConnections, for every auxiliary stream, which complicates synchronization and increases the risk of disconnection events when transitioning between sessions. As more auxiliary functions are added—such as waiting-room video playback, caption delivery, and sign-language interpretation—the number of concurrent sessions scales upward, consuming additional bandwidth and compute cycles even when only a subset of participants require the additional media. This fragmented architecture introduces operational inefficiencies, increases implementation complexity, and limits the feasibility of deploying advanced auxiliary media workflows at scale.

Despite these attempts, existing systems do not provide a unified architecture that integrates session continuity, selective routing, and dynamic auxiliary media delivery. As such, individuals are left staring at a blank screen, unsure of when their wait will end and without any engaging or informative content to occupy their time.

SUMMARY

The present disclosure provides a computing system and set of processes for dynamically delivering pre-recorded audio/visual content within the waiting-room interface of a video conferencing session. The invention improves upon conventional systems by combining real-time session management, content classification, and selective content distribution techniques into a unified compute architecture capable of operating across multiple conferencing platforms.

In one embodiment, a Content Delivery Injection Server initiates a secure handshake with the video conferencing system to establish a single-session context in which auxiliary media streams, such as pre-recorded videos, are injected without requiring a new connection or renegotiation of encryption or transport protocols. This architecture parallels the persistent-session techniques described in adaptive multimedia systems, ensuring low latency and uninterrupted continuity from waiting-room playback through meeting initiation.

A Content Management Subsystem coordinates the intelligent selection and delivery of media assets and includes an Event Classification Engine, an A/V Content Selection Engine, and a Content Library. The Event Classification Engine analyzes incoming event metadata—such as meeting title, participant composition, time of day, or organizer identity—to determine a classification for the conferencing session. Based on this classification, the A/V Content Selection Engine queries the Content Library to retrieve a pre-recorded audio/visual asset that matches the session context, available playback duration, and device capability constraints. Media assets are stored together with metadata describing codec type, resolution, duration, and accessibility attributes, enabling real-time matching without manual configuration.

The system further employs an Adaptive Delivery Controller, which manages transmission of the selected content through the conferencing platform's programmatic interface using existing session identifiers. Similar to selective forwarding techniques used in dynamic media routing systems, the controller distributes media only to endpoints that remain in the waiting-room state and terminates delivery upon transition into the live session, thereby conserving compute and network resources.

An Engagement Platform and Engagement Database record performance data—including playback duration, device type, and engagement indicators—and provide these data to an adaptive rules engine that may automatically adjust content selection criteria over time. The system may be deployed in centralized, distributed, or hybrid compute environments and supports the dynamic allocation and release of resources based on session state.

This orchestration layer forms part of SSOAR (Single-Session Orchestration and Adaptive Routing), a system for dynamically delivering auxiliary media, accessibility services, and interaction workflows within a continuous session context. In certain embodiments, the same orchestration framework may selectively activate captioning, sign-language avatar tracks, or other accessibility streams only for participants that require them, without affecting the remaining session members.

Through this combination of automated session classification, selective content routing, real-time orchestration, and adaptive feedback, the disclosed system replaces static waiting-room experiences with an intelligent, data-driven media delivery framework that operates without disrupting the underlying conferencing session and enables scalable integration across heterogeneous video platforms.

The disclosed system provides a session-integrated approach to auxiliary media delivery that differs from conventional multi-session or static-content implementations, as it utilizes the previously unused display regions within the waiting-room interface to deliver contextually relevant auxiliary media. This not only provides an opportunity for companies to showcase their products or messages but also enhances the user experience by eliminating the monotony of a static waiting screen.

The invention offers several benefits. It provides an additional platform for companies to familiarize users with their products or services. This is achieved by displaying pre-recorded video messages or advertisements during the waiting period of a video call. Consequently, the waiting time is transformed into a productive and engaging period for the user.

Compared to prior solutions, this invention is an improvement as it effectively utilizes the waiting period of a video call. Where previous solutions may have left users staring at static or non-interactive screens, this invention provides an engaging and informative experience. It also offers a unique opportunity for entities to connect with users, enhancing their outreach efforts.

The present invention relates to a system and method for displaying pre-recorded video messages or advertisements in the waiting room of a video call. In conventional video calling systems, when a user is placed in a waiting room before the call is answered, they are often presented with a blank screen or a static image. This invention aims to utilize this idle time by replacing the blank space with pre-recorded video content, such as messages or advertisements, selected by the video call provider.

In summary, this invention transforms the idle time in video call waiting rooms into an opportunity for providers to engage users with pre-recorded video content, offering a more dynamic and informative waiting experience while maximizing the potential for communication and promotion.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
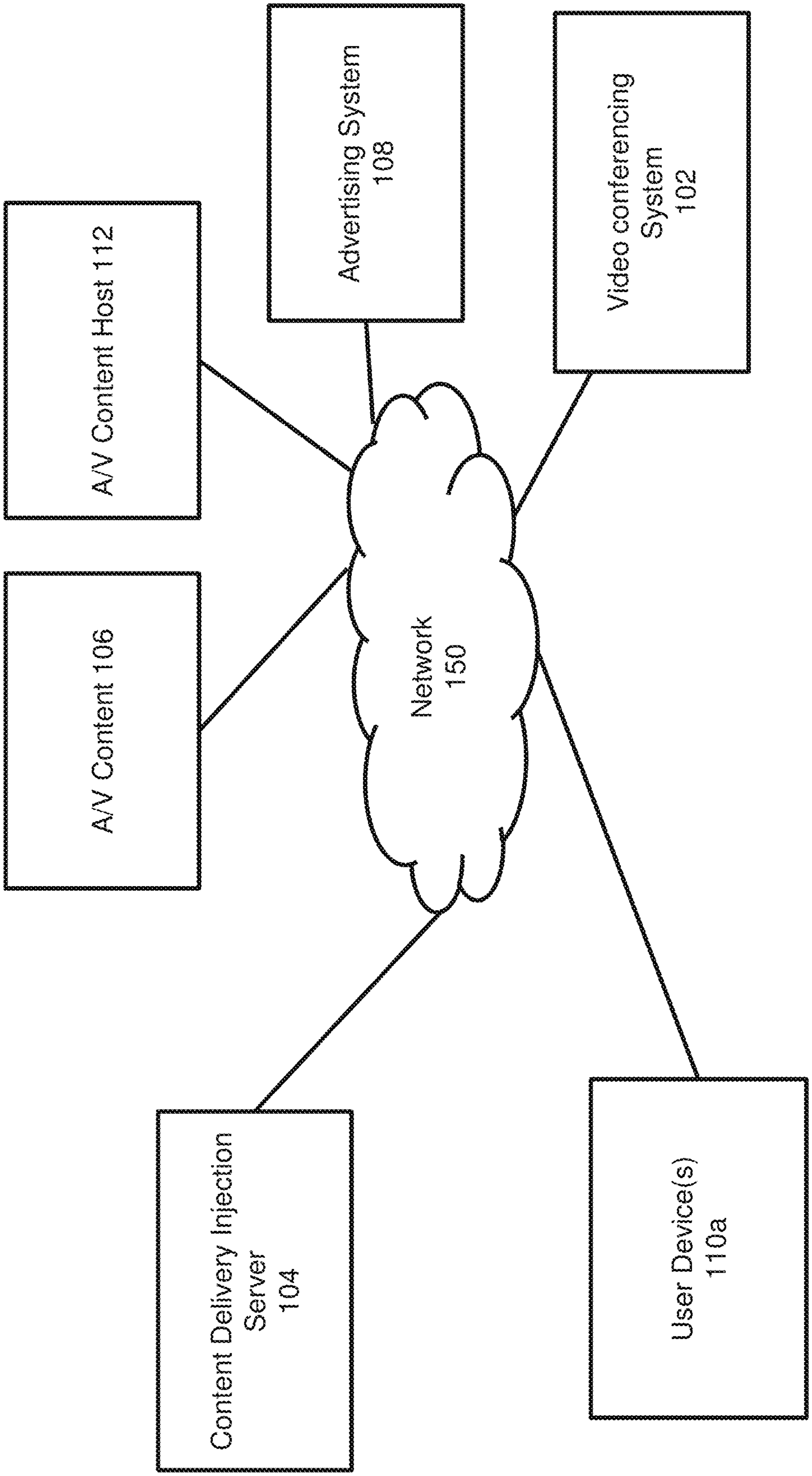
FIG. 1 illustrates a network architecture for pre-recorded video ads play in video call wait room in accordance with an exemplary embodiment of the invention.

In one embodiment, the disclosed system operates within an orchestration framework referred to herein as Single-Session Orchestration and Adaptive Routing (SSOAR). SSOAR provides a unified control layer that coordinates the activation, routing, and teardown of auxiliary media services within a continuous conferencing session without requiring re-negotiation of transport security or media channels. The SSOAR framework maintains awareness of session state across endpoints and is configured to selectively instantiate content delivery paths only for participants that meet defined criteria, such as being present in a waiting-room state or requiring accessibility accommodations. Through a combination of signaling interfaces, routing policies, and stateful media injection logic, SSOAR enables the platform to deliver pre-recorded waiting-room content, accessibility services, or other auxiliary audio/visual streams using the same session identifiers established during initial handshake procedures. By avoiding the creation of new SIP Call-IDs, WebRTC PeerConnection instances, or parallel media tunnels, the SSOAR layer minimizes latency, reduces encryption overhead, and preserves session continuity across all participants. In certain embodiments, SSOAR additionally incorporates monitoring hooks that provide real-time analytics regarding stream performance, engagement duration, and delivery efficiency, enabling the system to dynamically adjust routing decisions based on observed network or user behavior. Alternative implementations may deploy SSOAR as a distributed compute fabric, an edge-assisted routing layer, or a software-defined media controller integrated with existing conferencing infrastructure while maintaining the same single-session operational semantics.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network Architecture

FIG. 1 illustrates an exemplary embodiment of pre-recorded video ads play in video call wait room according to one embodiment. This figure shows the different networked components that make up the On hold Video System The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

In one embodiment, the Video Conferencing System 102 is a comprehensive platform developed by the provider to facilitate video conference calls and display pre-recorded videos to participants. The system serves as the central hub for hosting virtual meetings and managing the waiting room experience. The primary function of the Video Conferencing System 102 is to establish and maintain a stable connection between participants, enabling them to communicate through video and audio in real-time. The system is designed to handle multiple concurrent video calls, ensuring a seamless experience for all users. When a participant joins a video call, the Video Conferencing System 102 initially places them in a virtual waiting room. Instead of displaying a blank screen or a static image, the system intelligently selects and plays pre-recorded video content to engage the waiting participants. The video content can be chosen based on various criteria, such as the purpose of the meeting, the participants' profiles, or the provider's preferences. The Video Conferencing System 102 integrates with a content management system and a database to store and retrieve the pre-recorded videos. When a participant enters the waiting room, the system sends a request to the content management system to fetch the appropriate video. The content management system processes the request, retrieves the video from the database, and sends it back to the Video Conferencing System 102. The system then seamlessly displays the video to the waiting participant. The Video Conferencing System 102 also incorporates a range of features to enhance the user experience. These may include virtual backgrounds, screen sharing, chat functionality, and the ability to mute or unmute participants. The system can adapt to different network conditions, automatically adjusting video and audio quality to ensure uninterrupted communication. Alternatives to the Video Conferencing System 102 include using third-party video conferencing platforms or developing a custom solution from scratch. Third-party platforms offer ready-made solutions with varying levels of customization, while a custom-built system allows for complete control over the features and functionality.

In various embodiments, Video Conferencing System 102 may be implemented using any platform capable of supporting persistent single-session media negotiation and programmatic auxiliary stream injection. For example, Video Conferencing System 102 may operate as a WebRTC-based conferencing environment in which auxiliary media tracks are injected through existing PeerConnection channels, or as a SIP-based system wherein auxiliary audio/video streams are routed using negotiated multiplex identifiers under a common Call-ID. In certain deployments, Video Conferencing System 102 may comprise a selective forwarding unit (SFU) that exposes upstream control hooks for dynamically adding or removing media sources without session teardown. Alternatives may further include MCU architectures, hybrid cloud media routers, or edge-assisted conferencing deployments, provided they maintain a single transport and encryption context through which auxiliary content may be orchestrated under the SSOAR framework In one embodiment, the Content Delivery Injection Server 104 is a system designed to facilitate the delivery of specific content during the holding period of a video call. The provider utilizes this system to request the content they wish to display during this period. The primary function of the Content Delivery Injection Server 104 is to receive and process content requests from the provider. Upon receiving a request, the system retrieves the specified content from a stored database or a designated source. This content could range from pre-recorded video messages to advertisements, depending on the provider's preference. The operation of the Content Delivery Injection Server 104 begins when a video call is initiated and the user is placed in the waiting room. The system then receives a content request from the provider. This request is processed, and the specified content is retrieved and prepared for delivery. Once the content is ready, it is injected into the waiting room interface, replacing the blank screen typically seen by the user. The content continues to play until the call is answered, at which point the system ceases the delivery of content. There are several alternatives to the Content Delivery Injection Server 104. One such alternative could be a system that automatically selects content based on predefined criteria, eliminating the need for the provider to manually request content. Another alternative could be a system that allows the user to select the content they wish to view during the waiting period. This could be achieved through a user interface that presents a selection of content options to the user upon entering the waiting room.

In certain embodiments, Content Delivery Injection Server 104 may operate as a standalone media injection service that interfaces with Video Conferencing System 102 through an authenticated application programming interface, while in other embodiments the functionality of Content Delivery Injection Server 104 may be integrated directly into an existing conferencing control plane or media router. Alternative implementations may employ a distributed injection model in which multiple regional delivery nodes selectively splice auxiliary media into established session pathways under SSOAR routing policies, thereby reducing latency and improving locality-based performance. In lightweight deployments, the Content Delivery Injection Server 104 may be replaced by a client-side injection agent that signals the conferencing system to fetch and render designated media assets while maintaining a single-session security context. Still further embodiments may implement this functionality as a virtualized compute workload co-located with a selective forwarding unit (SFU), enabling direct media plane insertion without requiring the establishment of additional transport channels.

In one embodiment, the A/V Content 106 represents the pre-recorded video content that is displayed to end users while they are in the waiting room of a video conference. This content serves as a replacement for the typical blank screen or static image that users encounter before the video call begins. The A/V Content 106 can consist of various types of videos, such as promotional messages, advertisements, instructional videos, or informative content related to the purpose of the video conference. The content is selected and provided by the video conference host or the platform provider, depending on their preferences and goals. The A/V Content 106 is stored in a database or a content management system associated with the video conferencing platform. Each video is typically associated with metadata that describes its characteristics, such as duration, format, resolution, and target audience. This metadata helps the system select the appropriate video to display based on the context of the video conference and the user's profile. When a user joins the waiting room of a video conference, the system identifies the relevant A/V Content 106 to display. It retrieves the selected video from the database and streams it to the user's device through the video conferencing platform. The video is played seamlessly within the waiting room interface, providing an engaging and informative experience for the user. The A/V Content 106 can be in various video formats, such as MP4, WebM, or HLS, depending on the compatibility requirements of the video conferencing platform and the user's device. The system may dynamically adapt the video quality and resolution based on the available network bandwidth to ensure smooth playback. Alternatives to pre-recorded A/V Content 106 include displaying live video feeds, interactive content, or personalized messages tailored to each user. Live video feeds can provide real-time updates or relevant information, while interactive content can engage users through quizzes, surveys, or games. Personalized messages can deliver targeted content based on the user's profile, interests, or previous interactions with the platform.

In one embodiment, the Advertising System 108 is a platform that facilitates the interaction between advertisers and meeting platform owners. This system allows advertisers to upload their content and bid on specific timeslots, channels, or meetings to display their advertisements. The primary function of the Advertising System 108 is to serve as a marketplace for ad spots. Advertisers can use this system to submit their content and propose bids for specific timeslots, channels, or meetings. Meeting platform owners can then review these submissions and select the content they wish to display based on the proposed bids and the relevance of the content. The operation of the Advertising System 108 begins when an advertiser uploads their content and proposes a bid for a specific timeslot, channel, or meeting. This information is displayed to the meeting platform owners, who can then review the submissions. The owners can compare the proposed bids and the relevance of the content to their platform and make a selection. Once a selection is made, the chosen content is prepared for display during the specified timeslot, channel, or meeting. There are several alternatives to the Advertising System 108. One such alternative could be a system where the meeting platform owners set a fixed price for ad spots, and advertisers can choose to pay this price to have their content displayed. Another alternative could be a system where the meeting platform owners and advertisers negotiate the price for ad spots. This could be facilitated through a negotiation interface that allows for back-and-forth communication between the owners and advertisers.

In one embodiment, the User Device(s) (110*a*) are the various computing devices used by end users to access and participate in video conferences. These devices serve as the primary interface for users to interact with the video conferencing platform and view the on-hold video content while waiting for their conference video call to begin. The User Device(s) (110*a*) encompass a wide range of computing devices, including mobile devices such as smartphones and tablets, laptops, desktop computers, and other internet-connected devices capable of running video conferencing applications. These devices are equipped with the necessary hardware and software components to enable video and audio communication over the internet. When a user joins a video conference using their User Device (110*a*), the device establishes a connection with the video conferencing platform through a network, typically the internet. The device sends a request to join the conference, and the platform authenticates the user and grants access to the virtual waiting room. Once in the waiting room, the User Device (110*a*) receives the on-hold video content from the video conferencing platform. The device's video conferencing application or web browser renders the video content on the screen, replacing the typical blank screen or static image. The user can view the video content while waiting for the conference to start. The User Device (110*a*) also facilitates user interactions with the video content and the video conferencing platform. Users can control the playback of the video, adjust the volume, or mute the audio using the device's controls. The device captures user inputs and gestures, such as taps or clicks, and communicates them to the video conferencing platform for appropriate actions. Alternatives to the User Device(s) (110*a*) include dedicated video conferencing endpoints, such as conference room systems or video kiosks. These specialized devices are purpose-built for video conferencing and offer enhanced features like high-quality cameras, microphones, and speakers. Another alternative is the use of virtual reality (VR) or augmented reality (AR) devices, which can provide immersive video conferencing experiences by simulating a shared virtual environment.

More broadly, user device(s) 110*a* include, generally, a computer or computing device including functionality for communicating (e.g., remotely) over a network 150. Data may be collected from user devices 110*a*, and data requests may be initiated from each user device 110*a*. User device(s) 110*a* may be a server, a desktop computer, a laptop computer, personal digital assistant (PDA), an in- or out-of-car navigation system, a smart phone or other cellular or mobile phone, or mobile gaming device, among other suitable computing devices. User devices 110*a* may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110*a* may be an electronic device including hardware, software, or embedded logic components or a combination of two or more such components and capable of carrying out the appropriate functions implemented or supported by the user device 110. For example and without limitation, a user device 110*a* may be a desktop computer system, a notebook computer system, a netbook computer system, a handheld electronic device, or a mobile telephone. The present disclosure contemplates any user device 110. A user device 110*a* may enable a network user at the user device 110*a* to access network 150. A user device 110*a* may enable its user to communicate with other users at other user devices 110.

A user device 110*a* may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110*a* may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110*a* one or more Hyper Text Markup Language (HTML) files responsive to the HTTP request. The user device 110*a* may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110*a* may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

System Architecture

Figure 2:
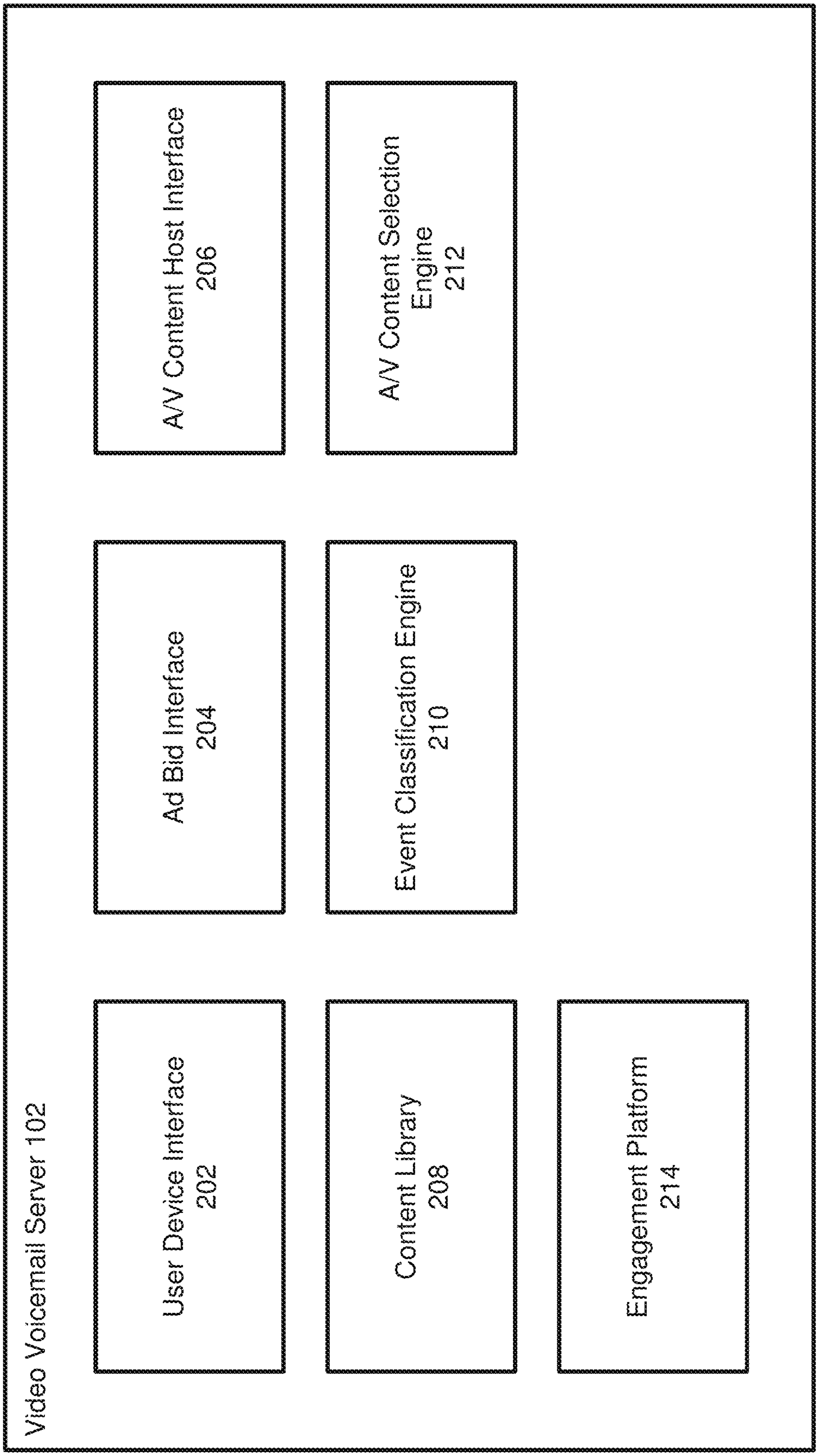
FIG. 2 illustrates a system architecture for pre-recorded video ads play in video call wait room in accordance with an exemplary embodiment of the present invention.
Figure 3:
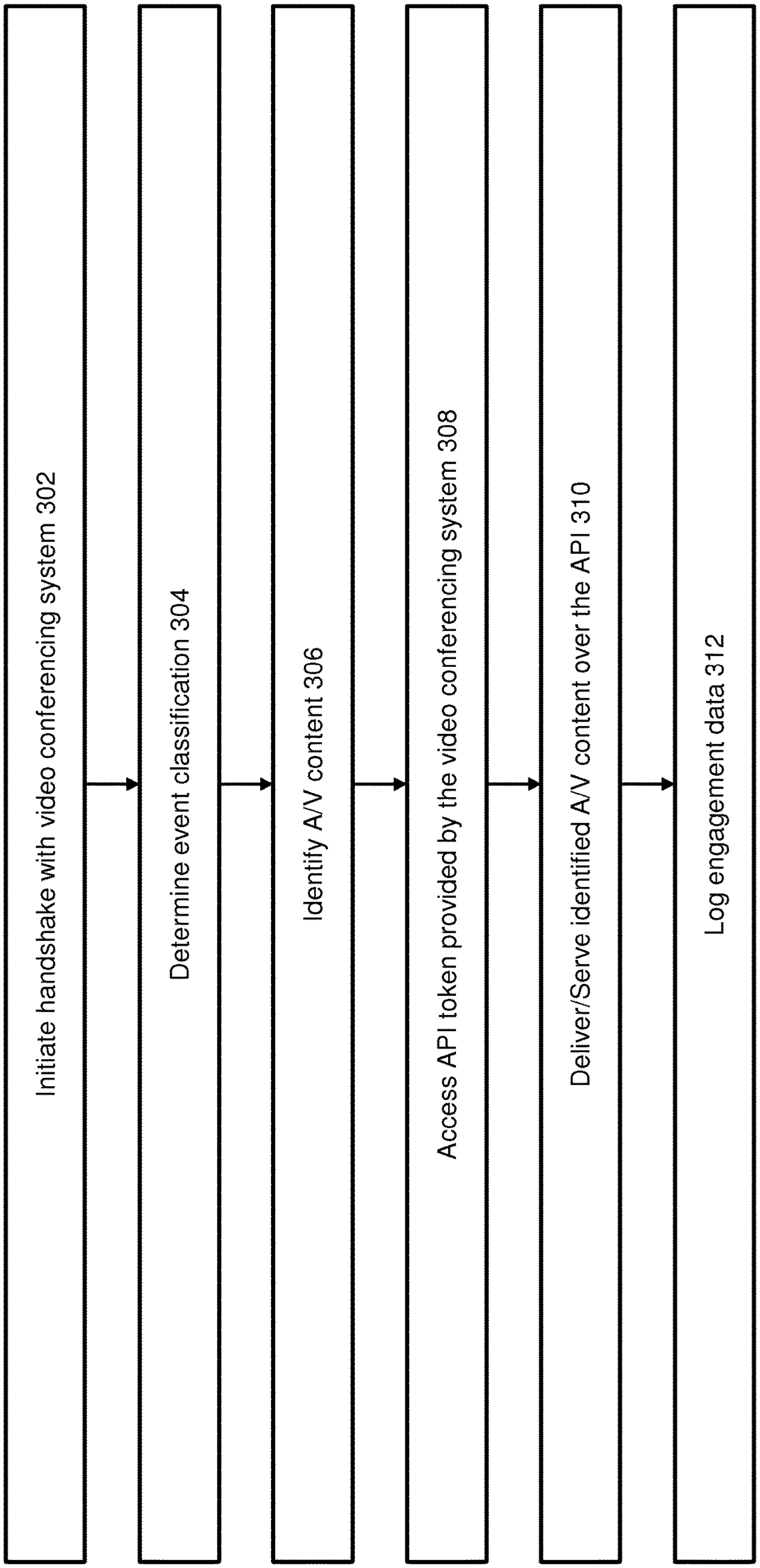
FIG. 3 illustrates an exemplary computer implemented process for pre-recorded video ads play in video call wait room according to one embodiment of the invention.

FIG. 2 illustrates an exemplary embodiment of the prerecorded video ads play in video call wait room. The interfaces, libraries, engines and platform that make up the CDI The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

In one embodiment, the User Device Interface 202 is an integral component of the Online Meeting Platform, designed to facilitate the display of content to end users. This interface serves as the visual bridge between the platform and the users, ensuring that the video content is presented seamlessly and effectively. The primary function of the User Device Interface 202 is to render the pre-recorded video content within the waiting room of the video call. When a user joins the waiting room, the interface receives the video content from the Video Conferencing System 102 and displays it on the user's device, replacing the conventional blank screen or static image. The User Device Interface 202 is designed to be compatible with a wide range of devices, including desktop computers, laptops, tablets, and smartphones. It adapts to the specific capabilities and screen sizes of each device, ensuring that the video content is displayed optimally. The interface employs responsive design techniques to provide a consistent and user-friendly experience across different platforms. To display the video content, the User Device Interface 202 utilizes standard web technologies such as HTML5, CSS, and JavaScript. When a user joins the waiting room, the interface establishes a connection with the Video Conferencing System 102 using web sockets or a similar technology. This connection allows the interface to receive the video content in real-time and display it to the user. The User Device Interface 202 also includes controls for interacting with the video content. These controls may include play/pause buttons, volume controls, and the ability to switch between different video content if multiple videos are available. The interface may also display additional information alongside the video, such as the title of the video, the duration, or a brief description. Alternatives to the User Device Interface 202 include using native mobile applications or desktop software to display the video content. Native applications can provide a more customized and optimized experience for specific devices, while desktop software can offer advanced features and integration with other tools.

In various embodiments, User Device Interface 202 may be implemented as a browser-based WebRTC client, a native conferencing application, or an embedded software component within a unified communications device, provided that the interface is capable of maintaining a persistent session context while receiving auxiliary media streams under SSOAR routing control. In certain configurations, User Device Interface 202 may expose signaling hooks that allow the conferencing platform to instruct the client to render injected content as a picture-in-picture window, a full-frame waiting-room display, or an auxiliary overlay track without requiring renegotiation of transport parameters. Alternative embodiments may employ thin client extensions, mobile SDKs, or set-top conferencing firmware that support selective subscription to injected media paths, enabling SSOAR-based delivery of waiting-room content, accessibility services, or other auxiliary streams without establishing additional parallel sessions or renegotiating any session security or transport parameters.

In one embodiment, the Ad Bid Interface, 204, serves as a platform for advertisers to present their content to meeting platform owners. This subsystem allows advertisers to indicate what they are willing to pay for their advertisements to be displayed during the waiting period of a video call. The Ad Bid Interface, 204, operates as a marketplace for ad spots. Advertisers can use this interface to submit their content along with their proposed payment for the ad spot. Meeting platform owners can then review these submissions and select the content they wish to display based on the proposed payment and the relevance of the content. The working of the Ad Bid Interface, 204, begins when an advertiser submits their content and proposed payment. This information is displayed to the meeting platform owners, who can then review the submissions. The owners can compare the proposed payments and the relevance of the content to their platform and make a selection. Once a selection is made, the chosen content is prepared for display during the waiting period of a video call. There are several alternatives to the Ad Bid Interface, 204. One such alternative could be a system where the meeting platform owners set a fixed price for ad spots, and advertisers can choose to pay this price to have their content displayed. Another alternative could be a system where the meeting platform owners and advertisers negotiate the price for ad spots. This could be facilitated through a negotiation interface that allows for back-and-forth communication between the owners and advertisers. In one embodiment, the A/V Content Host Interface, 206, serves as a conduit for the transfer of advertisers' content to meeting platforms. This subsystem not only enables the availability of content but also records the number of user requests for specific content.

The A/V Content Host Interface 206 primarily functions as a content repository and a tracking system. It hosts the content provided by advertisers and makes it accessible to meeting platforms. Simultaneously, it monitors and records the number of user requests for each piece of content. The operation of the A/V Content Host Interface, 206, begins when an advertiser uploads their content to the system. This content is then made available to meeting platforms. When a user request for content is received, the system retrieves the requested content and delivers it to the meeting platform. Concurrently, the system records this request in its tracking system, maintaining a count of how many times each piece of content has been requested. There are alternatives to the A/V Content Host Interface, 206. One such alternative could be a system that not only tracks the number of user requests but also records other metrics, such as the duration of content viewings or the number of complete viewings. Another alternative could be a system that allows meeting platform owners to directly upload and manage their own content, eliminating the need for content to be provided by advertisers. In various embodiments, A/V Content Host Interface 206 may operate as a storage abstraction layer that retrieves pre-recorded media assets from a local object store, a cloud-based content delivery network, or a third-party media hosting service, provided that the retrieved assets can be routed through the SSOAR framework without requiring creation of a separate media session In one embodiment, the Content Library 208 serves as the centralized repository for all pre-recorded audio/visual assets available for display during the waiting-room phase of a video conferencing session. The Content Library 208 stores each media asset together with associated metadata, including but not limited to file type, duration, codec, resolution, language, accessibility attributes, and classification tags. The Content Library 208 is communicatively coupled to the A/V Content Selection Engine 212 and the Content Delivery Injection Server 104 through secure data interfaces that enable retrieval of content in real time without interrupting the underlying video session. When a request for content is received, the Content Library 208 provides a content manifest describing eligible assets matching the selection criteria determined by the Event Classification Engine 210 and the A/V Content Selection Engine 212. The Content Library 208 may employ a distributed or cloud-based storage architecture utilizing object storage systems, content delivery networks (CDNs), or database indexing structures optimized for low-latency retrieval. Access to the stored content may be managed through an application programming interface (API) that enforces authentication, encryption, and version control to ensure consistent and secure delivery of approved media assets. In certain embodiments, the Content Library 208 includes a transcoding or format adaptation module configured to automatically convert stored files into output formats compatible with the target user device capabilities or network conditions. Alternatives to the Content Library 208 may include decentralized or edge-based caching systems that replicate commonly accessed media assets across geographically distributed nodes to reduce latency. In another alternative, the library may be replaced by a third-party content management service or an external advertising network that streams the selected content directly from its own storage infrastructure, thereby reducing hosting requirements for the conferencing platform provider. Yet another alternative implementation may employ a dynamic fetch model in which the content selection engine retrieves real-time streams from external sources via secure URLs, eliminating persistent storage of media files within the platform environment.

In various embodiments, Content Library 208 may be implemented as a centralized media repository, a distributed object storage fabric, or a federated content index spanning multiple cloud regions, provided that the stored audio/visual assets can be retrieved and delivered within a single-session transport context under SSOAR control. In some configurations, the Content Library 208 may maintain multiple encoded variants of each asset—distinguished by codec, resolution, or duration—allowing the system to select a version compatible with existing session parameters without initiating a new media negotiation.

In one embodiment, the Event Classification Engine 210 is a subsystem designed to analyze and categorize events within a video conferencing or digital meeting platform. Its primary purpose is to assign a classification to each event, providing advertisers with insight into the nature of the event where their content will be displayed. The Event Classification Engine 210 operates by analyzing event metadata, which may include the event title, description, participant list, and other relevant information. Based on this analysis, the engine applies predefined criteria to categorize the event into specific classifications. These classifications could range from business meetings, educational sessions, casual gatherings, to specialized webinars. Once an event is classified, this information is made available to advertisers, enabling them to target their content more effectively to the desired audience. The process begins when an event is created or scheduled within the platform. The Event Classification Engine 210 retrieves the event's metadata and applies its classification algorithms to determine the most appropriate category for the event. This categorization is then stored in the system and can be accessed by advertisers when selecting the events for their content placement. Alternatives to the Event Classification Engine 210 could include a manual classification system, where event creators select the category of their event from a predefined list. Another alternative could be a user-driven classification system, where participants or viewers vote on or suggest classifications for events, providing a more dynamic and potentially more accurate reflection of the event's nature.

In one embodiment, the A/V Content Selection Engine 212 is configured to determine which pre-recorded audio/visual content from the Content Library 208 is most suitable for delivery to participants in the waiting room of an active video conferencing session. The A/V Content Selection Engine 212 operates by receiving classification data from the Event Classification Engine 210 and analyzing one or more contextual parameters such as event type, time of day, participant region, device capabilities, and historical engagement metrics. Based on these parameters, the A/V Content Selection Engine 212 applies a set of weighted selection rules or algorithms to identify a media asset that meets predefined criteria for relevance, duration, and format compatibility. The selection process may incorporate real-time system factors such as network bandwidth and available playback time before meeting initiation, ensuring that the selected content can be streamed without delay or buffering. The A/V Content Selection Engine 212 communicates directly with the Content Delivery Injection Server 104 to initiate transfer of the chosen media asset through the conferencing platform's authorized interface. In certain embodiments, the engine may maintain a decision cache or ranking table that records past selections and associated engagement outcomes, thereby enabling adaptive content targeting through machine learning or rule-based optimization. The engine may also integrate with the Engagement Platform 214 to retrieve and evaluate performance data, automatically adjusting weighting factors to improve future content relevance and playback performance. Alternatives to the A/V Content Selection Engine 212 may include manual content assignment systems in which an administrator or meeting host pre-selects one or more media assets for display. Another alternative may employ a hybrid selection model wherein an external recommendation service or advertising exchange dynamically provides ranked content lists in response to metadata queries. In lightweight deployments, the A/V Content Selection Engine 212 may be replaced with a static rule set that selects default or provider-specified content without performing event-based classification or engagement analysis. Regardless of implementation, the A/V Content Selection Engine 212 ensures that the media presented during the waiting-room phase is contextually appropriate, technically compatible, and delivered within the operational parameters of the video conferencing system.

In one embodiment, the Engagement Platform 214 is a subsystem designed to collect, analyze, and report metrics related to events and advertising content within a digital meeting or video conferencing platform. This platform provides comprehensive insights into user engagement, content performance, and overall event success. The Engagement Platform 214 functions by integrating with the video conferencing system to track various metrics, such as the number of attendees at an event, the duration of their attendance, interaction rates with the content, and user feedback on the advertising content displayed. This data is collected in real-time and processed to generate detailed reports. These reports offer valuable insights into the effectiveness of advertising content and the engagement level of events, enabling advertisers and event organizers to make informed decisions. The operation of the Engagement Platform 214 begins with the collection of data from various points within the video conferencing system. This includes direct user interactions, such as clicks and views, as well as indirect indicators of engagement, such as the time spent in an event. The subsystem then processes this data, applying statistical and analytical models to derive meaningful metrics. Finally, it compiles these metrics into reports that are accessible to advertisers and event organizers, providing them with a clear understanding of performance and engagement levels. Alternatives to the Engagement Platform 214 could include simpler analytics tools that focus solely on basic metrics like attendance numbers and view counts, without delving into deeper engagement analysis. Another alternative could be third-party analytics services that integrate with the video conferencing system, offering a range of reporting features but potentially requiring additional setup and integration efforts.

Computer Implemented Process

The Video Meeting platform provider would allow the video meeting host to upload "waiting room videos" which could be commercials or how to videos that would be shown to video meeting participants after they join the call but before the meeting has started. The Platform Provider could also have videos of their own that could be shown on "free meetings" or as a default if the meeting host doesn't provide any. The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

In one embodiment, the process of "Initiate Handshake with video conferencing system 302" is a step in establishing a connection between the content management system and the video conferencing platform. This process sets the stage for the seamless delivery of pre-recorded video content to the waiting room of the video call. The primary function of this handshake process is to establish a secure and reliable communication channel between the two systems. By initiating the handshake, the content management system identifies itself to the video conferencing system and requests access to deliver the video content. The handshake process typically involves the exchange of authentication credentials and the negotiation of communication protocols. The content management system sends a request to the video conferencing system, including any necessary authentication tokens or API keys. The video conferencing system verifies the authenticity of the request and grants access if the credentials are valid. Once the handshake is successful, the content management system establishes a persistent connection with the video conferencing system. This connection may be based on protocols such as WebSocket, which allows for real-time, bidirectional communication between the two systems. Through this established connection, the content management system can now send commands and data to the video conferencing system. It can request information about the waiting room, such as the number of participants and their device capabilities. Based on this information, the content management system can select the appropriate pre-recorded video content to be delivered. The handshake process also allows for the negotiation of video streaming parameters, such as the video format, resolution, and bitrate. This ensures that the video content is delivered in a format that is compatible with the video conferencing system and optimized for the network conditions. Alternatives to the handshake process include using REST APIs or other request-response mechanisms for communication between the content management system and the video conferencing system. These alternatives may be suitable for simpler integrations or scenarios where real-time communication is not required. However, the handshake process using protocols like WebSocket provides a more efficient and responsive approach for delivering video content in real-time.

In various embodiments, the step of initiating a handshake with the video conferencing system 302 may comprise establishing a secure signaling exchange using WebRTC offer/answer procedures, provided that the resulting transport and encryption context remains persistent for subsequent auxiliary media routing under SSOAR control. In some implementations, the handshake may include token-based authentication, mutual TLS, or OAuth-based authorization flows that permit the system to inject additional media without reopening or renegotiating the session. Alternative embodiments may employ pre-provisioned session identifiers or conferencing platform webhooks that allow the orchestration layer to attach auxiliary content immediately upon detection of a pending waiting-room state, thereby eliminating the need to establish secondary or parallel media sessions In one embodiment, the software process, Determine Event Classification 304, is a procedure within a system that categorizes events based on specific parameters. The primary function of Determine Event Classification 304 is to analyze and categorize events. This categorization is based on various factors such as the nature of the event, the participants involved, the duration, and other relevant parameters. The operation of Determine Event Classification 304 begins when an event is initiated within the system. The process then analyzes the event based on the predefined parameters. Once the analysis is complete, the process assigns a classification to the event. This classification can then be used for various purposes within the system, such as determining the appropriate content to display or the appropriate actions to take. There are several alternatives to Determine Event Classification 304. One such alternative could be a process that classifies events based on user input rather than predefined parameters. This would allow users to manually categorize their events. Another alternative could be a process that uses machine learning algorithms to classify events. This would allow the system to learn from past events and improve its classification accuracy over time.

In one embodiment, the software process, Identify A/V Content 306, is a procedure that recognizes and identifies audio/visual content within a system. The primary function of Identify A/V Content 306 is to detect and recognize specific audio/visual content. This process can identify content based on various factors such as the content's metadata, visual or audio features, or other unique identifiers. The operation of Identify A/V Content 306 begins when audio/visual content is introduced into the system. The process then analyzes the content based on its unique identifiers or features. Once the analysis is complete, the process identifies the content and assigns it a unique identifier within the system. This identifier can then be used to retrieve or manipulate the content in subsequent operations. There are several alternatives to Identify A/V Content 306. One such alternative could be a process that identifies content based on user input, allowing users to manually identify their content. Another alternative could be a process that uses machine learning algorithms to recognize and identify content. This would allow the system to learn from past identifications and improve its accuracy over time.

In one embodiment, the software process, Access API Token Provided by the Video Conferencing System 308, is designed to securely access and utilize the Application Programming Interface (API) of a video conferencing system. The primary function of this software process is to obtain an API token that grants permission to interact with the video conferencing system's features. This token is a piece of digital data that authenticates and authorizes the software to make requests on behalf of a user or system. The operation of Access API Token Provided by the Video Conferencing System 308 begins when the software sends a request to the video conferencing system's API. This request includes credentials, such as a username and password or a client ID and client secret, depending on the system's requirements. Upon validating these credentials, the video conferencing system issues an API token. The software then uses this token to authenticate subsequent requests, allowing it to access specified features or data within the video conferencing system. There are several alternatives to Access API Token Provided by the Video Conferencing System 308. One alternative could be a process that utilizes OAuth, an open standard for access delegation, to obtain an access token without sharing user credentials directly. Another alternative could involve using API keys, which are simpler than tokens and do not require an authentication step for each use but may offer less security.

In one embodiment, the software process, Deliver/Serve Identified A/V Content Over the API 310, is designed to efficiently distribute audio/visual content to users through an Application Programming Interface (API). The primary function of this software process is to deliver or serve the identified A/V content to the end-user or client application upon request. This involves retrieving the specified content from a content repository and transmitting it over the network through the API. The operation of Deliver/Serve Identified A/V Content Over the API 310 begins when a request for specific A/V content is received via the API. The software process then queries a content database or storage system to locate the requested A/V content. Once the content is retrieved, it is prepared for transmission. This preparation may involve format conversion or compression to ensure compatibility and efficient delivery over the network. The prepared content is then served to the requesting user or application through the API, completing the delivery process. There are several alternatives to Deliver/Serve Identified A/V Content Over the API 310. An embodiment of the invention involves the use of content delivery networks (CDNs) to cache and serve A/V content closer to the end-user, reducing latency and improving delivery speed. Another alternative could be peer-to-peer (P2P) delivery mechanisms, where content is distributed among users, reducing the load on central servers and potentially improving content delivery efficiency. In various embodiments, the deliver or serve identified audio/visual content over the API 310 step may comprise transmitting a pre-recorded media asset through an existing conferencing platform application programming interface using the same session transport parameters negotiated during the initial handshake, thereby enabling auxiliary stream injection without creating a parallel session. In some implementations, the injected content may be delivered as an additional media track within a WebRTC PeerConnection, as a multiplexed RTP stream under a shared SSRC, or as an authenticated streaming resource rendered by the client in a picture-in-picture or full-frame mode In one embodiment, the software process, Log Engagement Data 312, is designed to collect and record user interaction data with audio/visual (A/V) content. This process systematically captures various metrics related to how users engage with the content, such as view duration, click-through rates, and interaction types. The primary function of Log Engagement Data 312 is to gather valuable insights into user behavior and content performance. This involves tracking user actions and responses to A/V content presented during video calls or other digital platforms. The process automatically records specified engagement metrics in a structured format, making it accessible for analysis and reporting. The operation of Log Engagement Data 312 begins when a user interacts with A/V content. The software process monitors and detects these interactions, capturing relevant data points. This data is then logged into a database or data storage system, where it is timestamped and associated with the specific user session and content. The collected data can later be retrieved and analyzed to inform content strategy, improve user experience, or guide advertising decisions. There are several alternatives to Log Engagement Data 312. One alternative could involve the use of analytics platforms that offer integrated engagement tracking and analysis tools, eliminating the need for a separate logging process. Another alternative could be real-time engagement tracking, where data is not only logged but also analyzed in real time to provide immediate insights or trigger automated responses based on user behavior.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components, process steps or the like may be and/or comprise hardware and/or software as described herein. For example, the systems, engines, and subcomponents described herein may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
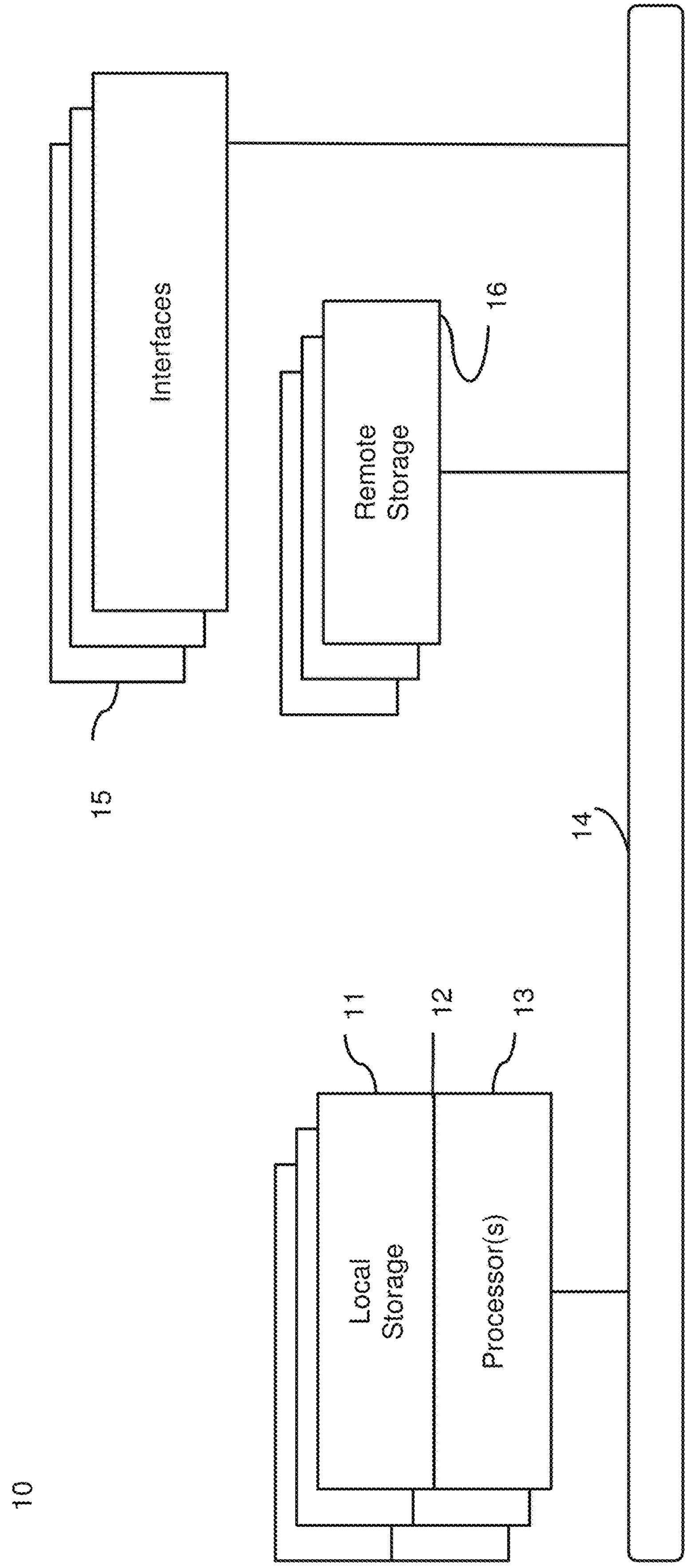
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips (GPU), such as a QUALCOMM SNAPDRAGON™ or SAMSUNG EXYNOS™ CPU as are becoming increasingly common in the art, such as for use in mobile devices or integrated devices.

As used herein, the term “processor” is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and “hybrid SSD” storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
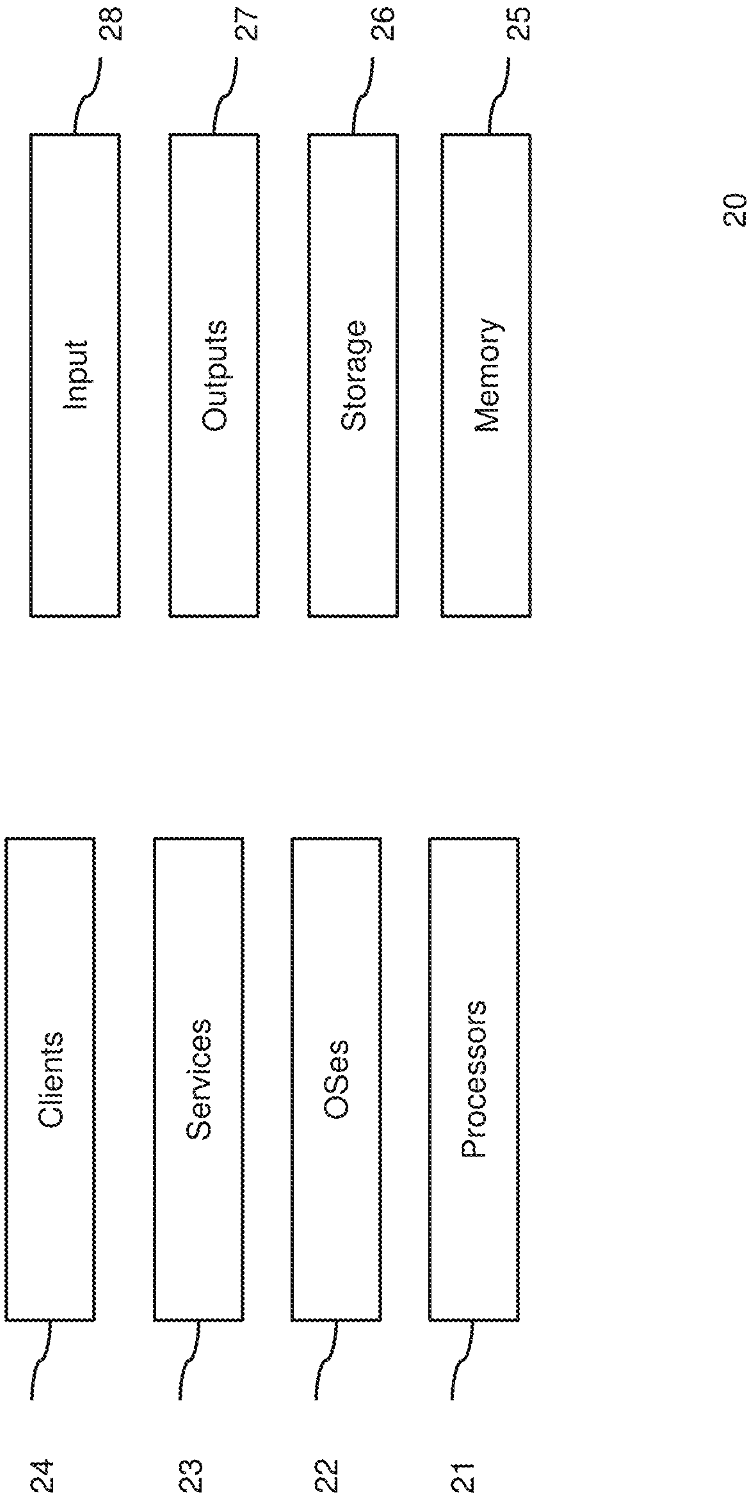
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
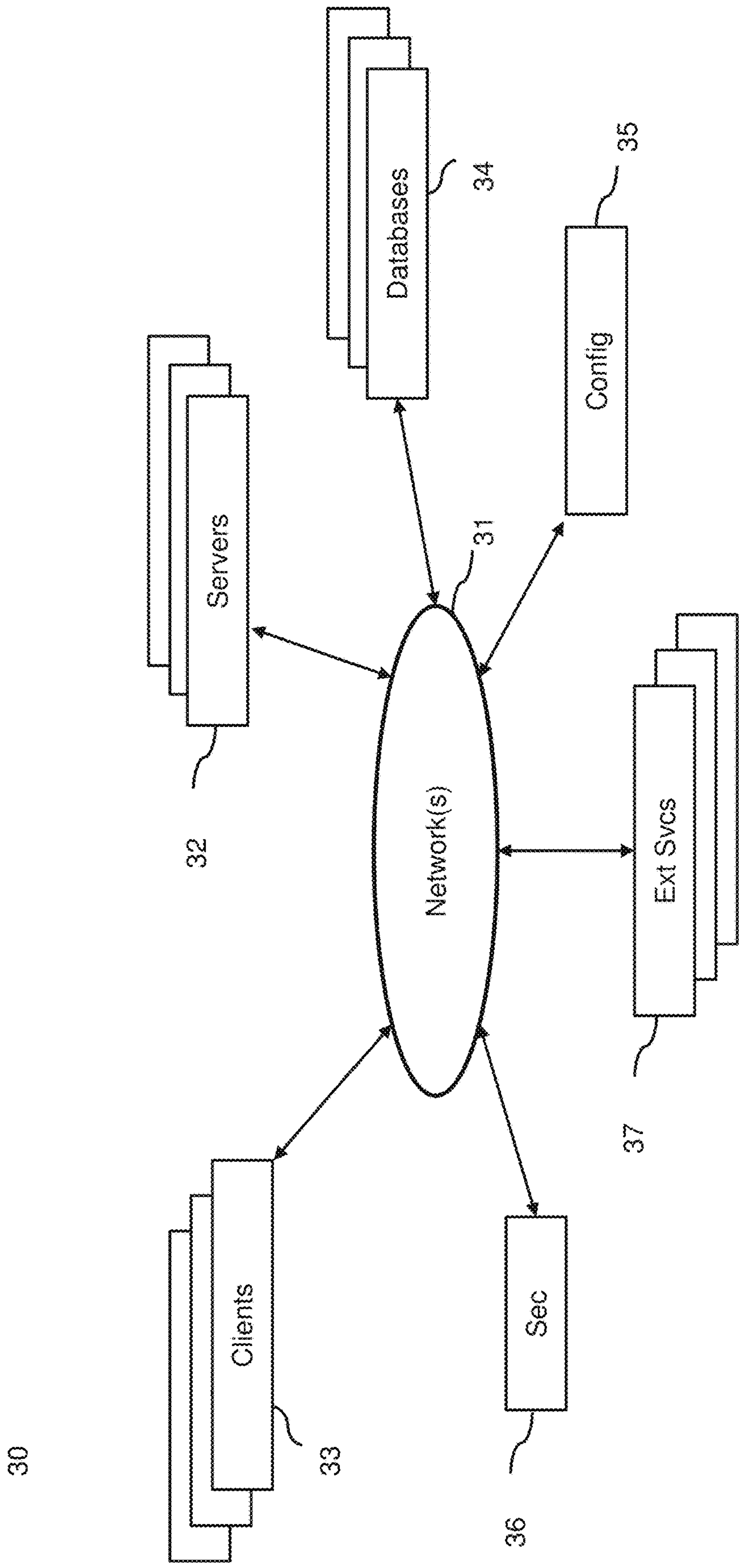
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
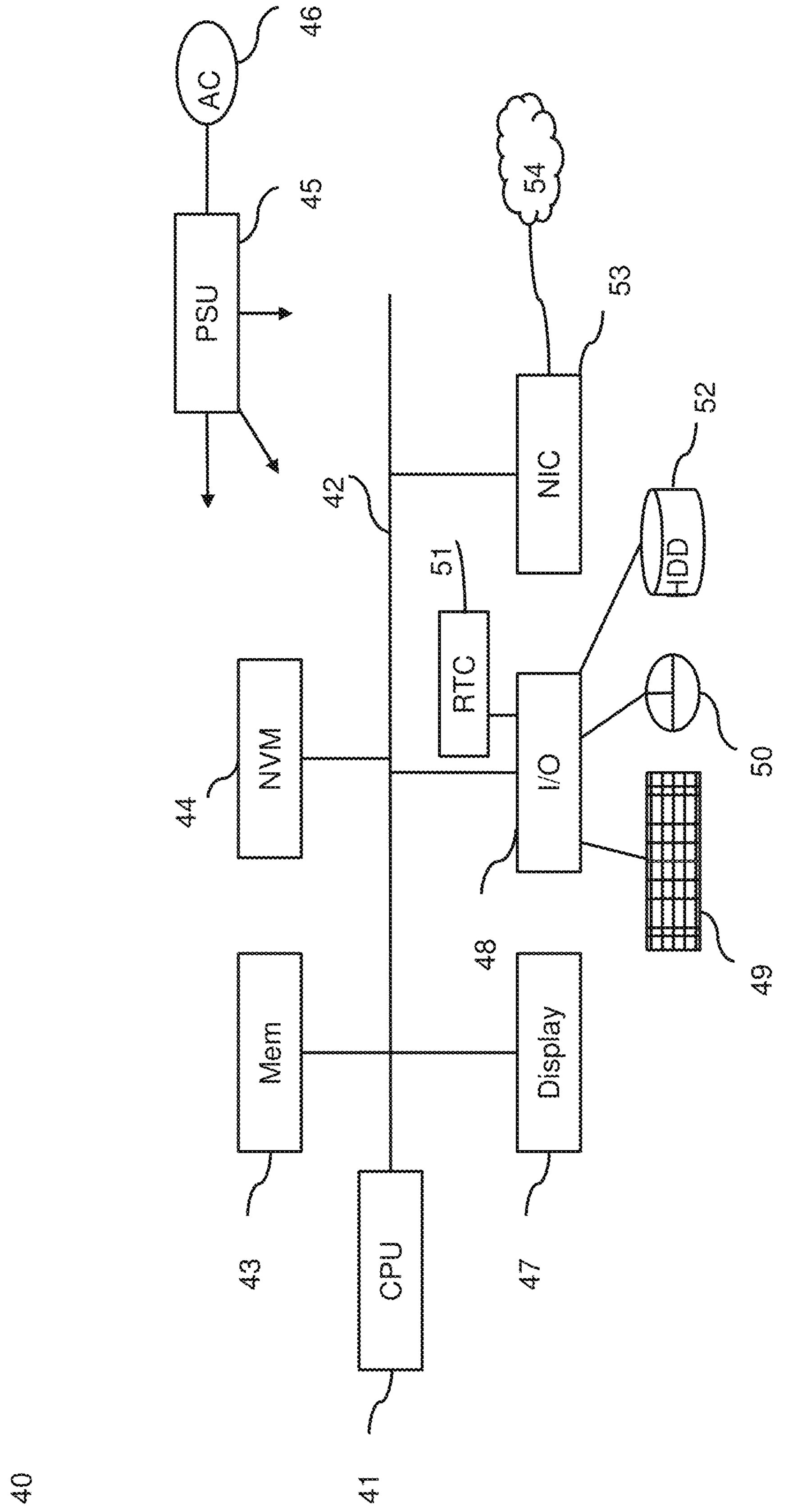
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for managing user communication within a single call session, the computer implemented method comprising:

initiating, by a content delivery injection server, a handshake with a video conferencing system to establish a communication session associated with at least one user device;

determining an event classification associated with the communication session based on metadata associated with the communication session received from the video conferencing system;

identifying at least one pre-recorded media asset from a content library, the identifying based on the event classification and one or more content selection criteria;

retrieving, by the content delivery injection server, an access credential and/or application programming interface (API) token provided by the video conferencing system authorizing delivery of third-party content through a waiting-room graphical interface of the video conferencing system;

transmitting, by the content delivery injection server, the at least one identified pre-recorded media asset through an API associated with the video conferencing system to the at least one user device;

displaying the pre-recorded media asset within the waiting-room graphical user interface prior to initiation of a live video conference, wherein the pre-recorded media asset is dynamically identified and displayed in real time;

logging engagement data associated with display of the pre-recorded media asset, the engagement data comprising at least one of duration of viewing, number of participants, or interaction events; and storing, in an engagement database, the logged engagement data for subsequent retrieval and analysis, wherein the communication session is maintained without termination and the displaying of the pre-recorded media asset occurs within the existing communication session's established transport and encryption context, without establishing any parallel media session or renegotiating any session security or transport parameters.

2. The computer implemented method according to claim 1, wherein the initiating of the handshake further comprises authenticating the content delivery injection server to the video conferencing system through a secure token exchange, comprising a WebSocket negotiation, OAuth authorization, and/or mutual Transport Layer Security (TLS) certificate validation.

3. The computer implemented method according to claim 1, wherein determining the event classification further comprises applying a machine-learning classifier to analyze the event metadata and assign a classification.

4. The computer implemented method according to claim 3, wherein the machine-learning classifier is trained using historical engagement data stored in the engagement database, the historical engagement data comprising prior event types, audience sizes, and/or prior user responses to pre-recorded media assets.

5. The computer-implemented method of claim 1, wherein identifying the pre-recorded media asset further comprises retrieving a media identifier and a format descriptor from the content library, the format descriptor specifying codec type, resolution, and duration constraints corresponding to the waiting-room interface of the video conferencing system.

6. The computer implemented method according to claim 1, wherein retrieving the access credential or API token further comprises generating an encrypted request from the content delivery injection server, transmitting the encrypted request to the video conferencing system, and receiving a time-limited API token for accessing the waiting-room content delivery endpoint.

7. The computer implemented method according to claim 1, wherein transmitting the pre-recorded media asset through the API further comprises adapting a transmission protocol based on available network bandwidth.

8. The computer implemented method according to claim 1, wherein the displaying further comprises displaying synchronized captions automatically generated from metadata associated with the pre-recorded media asset.

9. The computer implemented method according to claim 1, wherein the displaying further comprises displaying an estimated wait time timer concurrently with playback of the pre-recorded media asset.

10. The computer implemented method according to claim 1, wherein logging engagement data further comprises monitoring playback initiation and termination timestamps and calculating total view duration per participant session.

11. The computer implemented method according to claim 10, wherein the engagement data is transmitted to the engagement database through a secure API and indexed by a session identifier associated with the corresponding communication session.

12. The computer implemented method according to claim 1, further comprising analyzing the stored engagement data to determine performance metrics comprising average view time, completion rate, and/or device type distribution.

13. The computer implemented method according to claim 12, further comprising automatically updating one or more content selection criteria of the audio/visual content selection engine in response to the analyzed engagement data.

14. The computer implemented method according to claim 1, further comprising storing diagnostic data comprising error logs, handshake response times, and delivery latency metrics within a system log repository accessible to an administrative console.

15. The computer implemented method according to claim 1, wherein the event metadata comprises at least one of an event title, description, participant list, and/or organizer identity.

16. The computer implemented method according to claim 1, wherein the content selection criteria comprises provider preferences, advertiser parameters, and/or audience characteristics.

17. The computer implemented method according to claim 1, wherein transmitting the at least one identified pre-recorded media asset is done within the existing session's established transport and encryption context, without establishing any parallel media session or renegotiating security parameters.

18. A computing system for managing user communication within a single call session, the computing system comprising:

at least one computing processor; and memory comprising instructions that, when executed by the at least one computing processor, enable the computing system to:

initiating, by a content delivery injection server, a handshake with a video conferencing system to establish a communication session associated with at least one user device;

determining an event classification associated with the communication session based on metadata associated with the communication session received from the video conferencing system;

identifying at least one pre-recorded media asset from a content library, the identifying based on the event classification and one or more content selection criteria;

retrieving, by the content delivery injection server, an access credential and/or application programming interface (API) token provided by the video conferencing system authorizing delivery of third-party content through a waiting-room graphical interface of the video conferencing system;

transmitting, by the content delivery injection server, the at least one identified pre-recorded media asset through an API associated with the video conferencing system to the at least one user device;

displaying the pre-recorded media asset within the waiting-room graphical user interface prior to initiation of a live video conference, wherein the pre-recorded media asset is dynamically identified and displayed in real time;

logging engagement data associated with display of the pre-recorded media asset, the engagement data comprising at least one of duration of viewing, number of participants, or interaction events; and storing, in an engagement database, the logged engagement data for subsequent retrieval and analysis, wherein the communication session is maintained without termination and the displaying of the pre-recorded media asset occurs within the existing communication session's established transport and encryption context, without establishing any parallel media session or renegotiating any session security or transport parameters.

19. A non-transitory computer readable medium comprising instructions that when executed by a processor enable the processor to execute a computer implemented method, the method comprising:

initiating, by a content delivery injection server, a handshake with a video conferencing system to establish a communication session associated with at least one user device;

determining an event classification associated with the communication session based on metadata associated with the communication session received from the video conferencing system;

identifying at least one pre-recorded media asset from a content library, the identifying based on the event classification and one or more content selection criteria;

retrieving, by the content delivery injection server, an access credential and/or application programming interface (API) token provided by the video conferencing system authorizing delivery of third-party content through a waiting-room graphical interface of the video conferencing system;

transmitting, by the content delivery injection server, the at least one identified pre-recorded media asset through an API associated with the video conferencing system to the at least one user device;

displaying the pre-recorded media asset within the waiting-room graphical user interface prior to initiation of a live video conference, wherein the pre-recorded media asset is dynamically identified and displayed in real time;

logging engagement data associated with display of the pre-recorded media asset, the engagement data comprising at least one of duration of viewing, number of participants, or interaction events; and storing, in an engagement database, the logged engagement data for subsequent retrieval and analysis, wherein the communication session is maintained without termination and the displaying of the pre-recorded media asset occurs within the existing communication session's established transport and encryption context, without establishing any parallel media session or renegotiating any session security or transport parameters.

* * * * *